Figures 1, 5, 6:
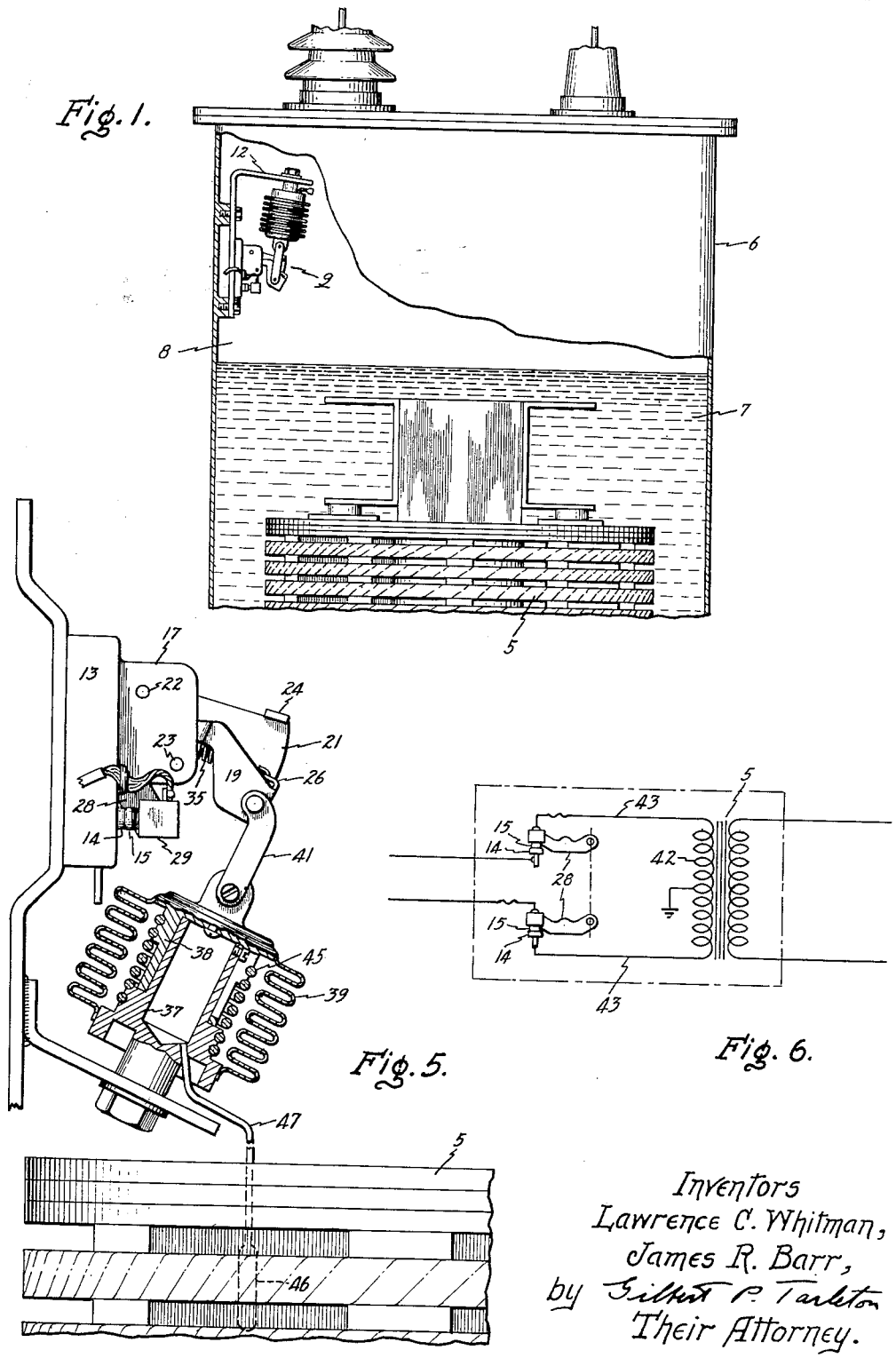

July 26, 1955 L. C. WHITMAN ET AL 2,714,143
CIRCUIT BREAKER
Filed May 6, 1954 2 Sheets-Sheet 1

Inventors
Lawrence C. Whitman,
James R. Barr,
by Gilbert P. Tarleton
Their Attorney.

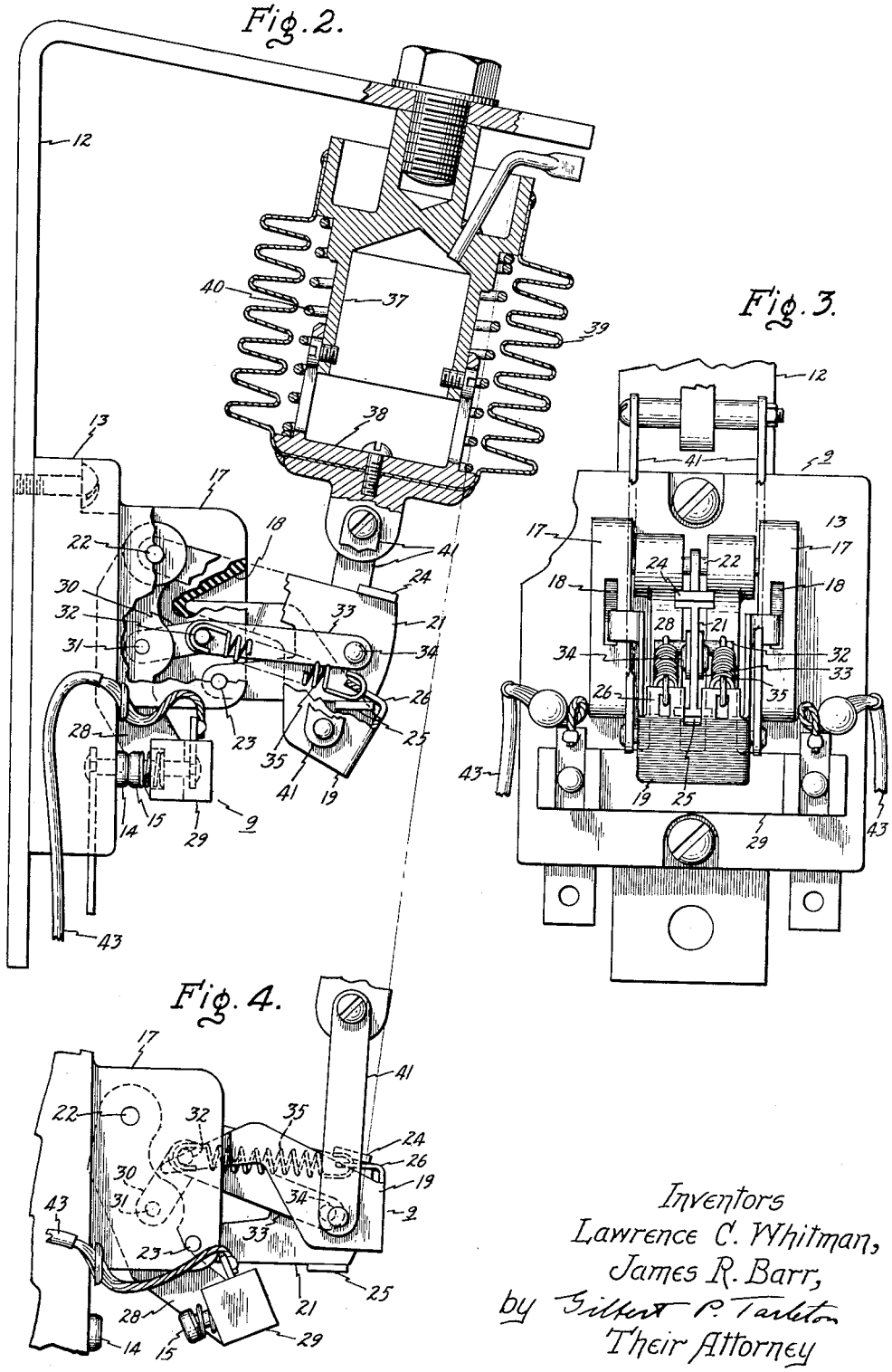

United States Patent Office 2,714,143
Patented July 26, 1955

2,714,143
CIRCUIT BREAKER

Lawrence C. Whitman, Pittsfield, Mass., and James R. Barr, Rome, Ga., assignors to General Electric Company, a corporation of New York Application May 6, 1954, Serial No. 427,904

5 Claims. (Cl. 200—140)

This invention relates to a circuit breaker or protective switch, and more particularly, to a circuit breaker or protective switch for interrupting the electrical circuit of an electrical apparatus upon overheating of same, said circuit breaker or protective switch being automatically operative to reclose said circuit upon cooling of said apparatus.

Available on the commercial market are a plurality of circuit breakers or protective switches designed to interrupt the electrical circuit of an electrical apparatus upon overheating of same or the like. Some of said devices after interrupting said electrical circuit do not automatically reclose said electrical circuit upon cooling of said overheated electrical apparatus, but must be closed manually. Accordingly, an interruption in an electrical circuit will result until such time as an operator can manually reclose the circuit breaker or protective switch.

It is an object of this invention to provide a circuit breaker or protective switch for automatically interrupting the electrical circuit of an electrical apparatus upon overheating of same or the like, said circuit breaker or protective switch being automatically operative to reclose said circuit upon cooling of said apparatus.

Our invention comprises an electrical protective switch having a pair of contacts adapted to be positioned in an electrical circuit, one of said contacts being stationary and the other of said contacts being movable, a spring toggle mechanism for snapping said movable contact into engagement and disengagement with said stationary contact, a closed hollow cylindrical bellows actuator for actuating said spring toggle mechanism, one end of said bellows actuator being stationary and the other end of said bellows actuator being movable, a spring interiorly of said bellows actuator connected to opposite ends thereof and continuously biasing said movable end for movement in one direction with respect to said stationary end, and a vaporizable fluid having high pressure vapors formed therefrom at a predetermined temperature cooperative with said bellows actuator whereby said high pressure vapors are operative to move said movable end in a direction opposite to said one direction.

Our invention further comprises an electrical protective switch for protecting an electrical apparatus from overheating by interruption of the electrical circuit thereof and for automatically closing said circuit after cooling of said apparatus, said apparatus enclosed within a casing and said switch disposed within said casing, said switch comprising a pair of contacts positioned in said circuit, one of said contacts being movable and the other of said contacts being fixed, a spring toggle mechanism for snapping said movable contact into engagement and disengagement with said fixed contact, a closed hollow cylindrical bellows actuator for actuating said spring toggle mechanism, one end of said bellows actuator being fixed and the other end of said bellows actuator being movable, a spring interiorly of said bellows actuator connected to opposite ends thereof and continuously biasing said movable end for movement in one direction with respect to said fixed end, and a vaporizable liquid having high pressure vapors formed therefrom at a predetermined temperature cooperative with said bellows actuator whereby said movable end is moved in a direction opposite to said one direction.

The features of our invention which we believe to be novel are set forth with particularity in the appended claims. Our invention itself, however, both as to its organization and method of operation, together with further objects and advantages thereof may best be understood by reference to the following description taken in connection with the accompanying drawings.

In the drawings, Fig. 1 is an elevational side view of one form of our invention. Fig. 2 is an enlarged detailed elevational side view of the circuit breaker or protective switch shown in Fig. 1 when in the closed position. Fig. 3 is a front view of the circuit breaker or protective switch shown in Fig. 2. Fig. 4 is a side view identical to that of Fig. 2 when the circuit breaker or protective switch is in the open position. Fig. 5 is an elevational side view of another form of our invention. Fig. 6 is a diagrammatic electrical circuit illustration of both forms of our invention. Throughout the various figures, like reference numerals will be used to indicate identical parts.

Referring now to the drawings, and more particularly to Fig. 1, shown therein is an electrical apparatus 5, as a stationary electrical induction apparatus or transformer, positioned within a casing or tank 6. Casing or tank 6 is partially filled with a vaporizable dielectric cooling liquid 7, and the electrical apparatus 5 is immersed in cooling liquid 7. Defined by the casing or tank 6 above the surface level of the cooling liquid 7 is a vaporization and condensation chamber or space 8. The vaporizable dielectric cooling liquid 7 has a predetermined boiling point temperature within the normal operating temperature range of the electrical apparatus 5. During normal operation of the electrical apparatus 5, vapors are formed from the cooling liquid 7 in the vaporization and condensation chamber or space 8 and condensed therein thus cooling the electrical apparatus 5. When the electrical apparatus 5 becomes overheated, said vapors will accumulate in the vaporization and condensation chamber or space 8 at very high pressures. Mounted on a portion of the casing or tank 6 is a circuit breaker or protective switch 9 disposed within the chamber or space 8. The circuit breaker or protective switch 9 is operative to interrupt the electrical circuit of the electrical apparatus 5 in response to said very high pressure vapors, and then to automatically reclose said electrical circuit after the electrical apparatus 5 has cooled.

Referring now more particularly to Figs. 2 and 3, the circuit breaker or protective switch 9 comprises an inverted L-shaped bracket or support 12. Connected to the downwardly extending leg portion of bracket 12 and disposed between the two leg portions of the bracket 12 is an electrical insulating material base 13. Carried by the base 13 are two pairs of engageable and disengageable contacts and a spring toggle mechanism. One contact 14 of each pair of engageable and disengageable pair of contacts is fixed or stationary, and another contact 15 of each pair of engageable and disengageable contacts is movable, and said spring toggle mechanism is adapted to snap the movable contacts 15 open or close with respect to the fixed or stationary contacts 14 upon actuation of said spring toggle mechanism.

Integrally formed in the base 13 are two spaced and parallel wall portions 17. Each of the wall portions 17 has an acute V-shaped groove 18 formed therein, and the V-shaped grooves 18 are adapted to serve as the pivot points for a U-shaped member 19. Each of the leg portions of the U-shaped member 19 are bent at an obtuse angle, and the extremities of said leg portions have acute V-shaped pointed ends. Said pointed ends are disposed in the acute V-shaped grooves 18 whereby the U-shaped member 19 can be rocked or pivoted downwardly and upwardly within the grooves 18.

Disposed midway between the wall portions 17 and the spaced leg portions of U-shaped member 19 is a flat U-shaped member 21. U-shaped member 21 is stationary or fixed by two pins 22 and 23 passing through the wall portions 17 and the extremities of the spaced leg portions of U-shaped member 21. U-shaped member 21 has two stop tabs 24 and 25 formed thereon cooperative with a pair of tabs 26 formed on the U-shaped member 19. The base or leg connecting portion of U-shaped member 19 is superposed with respect to the base or leg connecting portion of flat U-shaped member 21. The pair of tabs 26 are spaced from each other and disposed along opposite sides of the flat U-shaped member 21 between the stop tabs 24 and 25. Downward movement of the U-shaped member 19 will be stopped when the tabs 26 strike the stop tab 25, see Fig. 2, and upward movement of the U-shaped member 19 will be stopped when the tabs 26 engage the stop tab 24, see Fig. 4.

A pair of switch arms 28 are disposed between the wall portions 17 and the flat U-shaped member 21 and are pivoted at their upper ends to the pin 22. The lower ends of the switch arms 28 are joined by an integral T-portion 29 which carries the movable contacts 15. A lever 30 disposed between the switch arms 28 is connected to the switch arms 28 by a pin 31 passing through the switch arms 28 and the lever 30. Another pin 32 connects an opposite end of the lever 30 to a pair of levers 33. The pin 32 is disposed generally between the spaced leg portions of the flat U-shaped member 21 and the levers 33 extend along opposite sides of the flat U-shaped member 21 and are connected thereto by a pin 34. Extending from opposite ends of the pin 32 to the tabs 26 are a pair of springs 35. As will be obvious to those skilled in the art, when the U-shaped member 19 is pivoted or rocked upwardly, see Fig. 4, the contacts 14 and 15 will be snapped open; and when the U-shaped member 19 is pivoted or rocked downwardly, see Fig. 2, the contacts 14 and 15 will be snapped closed.

The means for actuating the spring toggle mechanism for snapping engagement and disengagement of the contacts 14 and 15 comprises a closed hollow cylindrical bellows-like actuator. Said bellows-like actuator comprises two telescopic cylindrical members 37 and 38. The telescopic members 37 and 38 are hermetically sealed within an accordion-like sleeve 39, and the interior of the telescopic members 37 and 38 and the sleeve 39 may have a vacuum or predetermined gas pressure formed therein. Concentrically disposed about the telescopic members 37 and 38 is a compressed spring 40. Spring 40 is disposed between the telescopic members 37 and 38 and the accordion-like sleeve 39, and is connected at its opposite ends to opposite end portions of the closed hollow cylindrical bellows actuator. The upper end of the closed hollow cylindrical bellows actuator is stationary or fixed and the lower end of the bellows actuator is movable with respect to said fixed end and connected to the U-shaped member 19 by a pair of levers 41.

Referring now to Fig. 6, the two pairs of engageable and disengageable contacts 14 and 15 are adapted to be disposed in the two secondary line leads 43 of the secondary electrical windings 42 of the stationary electrical apparatus or transformer 5, the neutral midpoint of said secondary electrical windings 42 being grounded. As will be obvious to those skilled in the art, the dielectric cooling liquid 7 has a predetermined boiling point temperature whereby when the maximum safe operating temperature limit of the electrical apparatus 5 has been exceeded the vapor pressure in the chamber or space 8 will have attained a high enough pressure to collapse the bellows actuator. When the bellows actuator is collapsed the lower movable end thereof moves upwardly and simultaneously moves the U-shaped member 19 counterclockwise to snap the contacts 14 and 15 open, see Fig. 4. When the electrical circuit of the electrical apparatus 5 is interrupted, the electrical apparatus 5 has an opportunity to cool to a temperature below said maximum safe operating temperature limit. As the vapors within the chamber or space 8 condense, the pressure within said chamber or space 8 decreases. After the electrical apparatus 5 has cooled and the vapor pressure within chamber or space 8 has decreased, the compressed spring 40 will expand the bellows actuator. As the bellows actuator expands, the lower end thereof moves downwardly and simultaneously rocks the U-shaped member 19 clockwise to snap the contacts 14 and 15 closed to restore electrical service, see Fig. 2. In some cases, it may be desirable to position the contacts 14 and 15 in the dielectric liquid 7 to provide better arc quenching. However, in all cases the bellows actuator should be in the gas space 8. By a proper selection and correlation of the compressed spring 40, the pressure interiorly of the bellows actuator, and the vapor pressure within the chamber of space 8, the tripping open and reclosing temperature limits of the circuit breaker 9 as well as the span between said limits can be accurately determined and varied to meet individual requirements. The form of invention disclosed in Fig. 1 is of particular value in vaporization cooled electrical installations where protection from excessive pressures on overload is a vital safety requirement. The arrangement shown in Fig. 1 might not operate reliably in conventional electrical apparatus installations not dependent upon vaporization and condensation cooling because of the lack of a vaporizable liquid to rapidly create pressure in the casing in response to the hottest part of the apparatus.

Referring now to Fig. 5, shown therein is another form of our invention not dependent upon vaporization and condensation cooling of the electrical apparatus 5. In this form of invention the bellows actuator expands to trip the circuit breaker or protective switch open, and contracts to reclose the circuit breaker or protective switch. Accordingly, the bellows actuator in this form of invention is disposed below the circuit breaker or protective switch spring toggle mechanism and contacts 14 and 15. The lower end of the bellows actuator is fixed or stationary, the upper end of the bellows actuator is movable, and the compressed spring 40 of the first form of invention is replaced by a tension spring 45 which continuously tends to collapse the bellows actuator. A thermal bulb 46 having a vaporizable liquid therein is disposed within or adjacent to the electrical apparatus 5 to be protected. The thermal bulb 46 is connected by a conduit 47 to the interior of the bellows actuator, and otherwise the form of the invention disclosed in Fig. 5 is identical in construction to the form of invention heretofore described. When the electrical apparatus to be protected from overheating or the like exceeds a predetermined safe operating temperature limit for said electrical apparatus, the vaporizable liquid within the thermal bulb 46 will have vaporized into the interior of the bellows actuator to expand same against the contracting action of tension spring 45. As the upper movable end of the bellows actuator moves upwardly, the U-shaped member 19 will be rocked counterclockwise to snap the contacts 14 and 15 open. With the circuit of the electrical apparatus to be protected interrupted, the electrical apparatus will cool from its overheated or overloaded condition. After sufficient cooling, the vapors within the bellows actuator will have condensed sufficiently to permit the tension spring 45 to contract the bellows actuator and simultaneously pivot the U-shaped member 19 clockwise to automatically reclose the contacts 14 and 15 and restore electrical service.

While there have been shown and described particular embodiments of the invention, it will be obvious to those skilled in the art that changes and modifications may be made without departing from the invention, and that it is intended by the appended claims to cover all such changes and modifications as fall within the true spirit and scope of the invention.

What we claim as new and desire to secure by Letters Patent of the United States is:

1. In an electrical apparatus enclosed in a casing, said apparatus submerged in a dielectric cooling liquid having a boiling point temperature within the normal operating temperature range of said apparatus, a circuit breaker positioned in said casing above the surface level of said liquid, said circuit breaker comprising a pair of engageable and disengageable contacts in the electrical circuit of said apparatus and an expansible and collapsible bellows actuator for engaging and disengaging said contacts, said bellows actuator collapsible and operable to disengage said contacts in response to a predetermined pressure increase in said casing, and said bellows expansible and operable to engage said contacts in response to a predetermined pressure decrease in said casing 2. In an electrical apparatus submerged in a dielectric cooling liquid within a closed casing, said liquid partially filling said casing, said liquid having a predetermined boiling point temperature whereby high pressure vapors of said liquid are formed in said casing when a predetermined maximum operating temperature of said apparatus is exceeded, a pair of contacts in the electrical circuit of said apparatus and means for automatically opening said contacts when said maximum operating temperature is exceeded and for automatically closing said contacts subsequent to said opening subsequent to a predetermined decrease in the temperature of said apparatus below said maximum operating temperature comprising a bellows actuator disposed in said high pressure vapors, said bellows actuator collapsible and operable in response to said high pressure vapors to open said contacts and expansible and operable in response to said predetermined decrease to close said contacts.

3. In a stationary electrical induction apparatus immersed in a dielectric cooling liquid within a closed casing partially filled with said liquid, a vaporization and condensation chamber in said casing above the surface level of said liquid, said liquid having a predetermined boiling point temperature whereby high pressure vapors of said liquid are formed in said chamber when the temperature of said apparatus exceeds a predetermined maximum operating temperature, a pair of contacts in the electrical circuit of said apparatus, a spring toggle mechanism for rapidly snapping said contacts open and close, and a closed bellows actuator for actuating said spring toggle mechanism, said closed bellows actuator disposed in said chamber, said closed bellows actuator having a compressed spring therein, said bellows actuator collapsible and expansible respectively in response to said high pressure vapors and a predetermined decrease in the pressure thereof.

4. In a transformer immersed in a dielectric cooling liquid within a closed tank partially filled with said liquid, a vaporization and condensation chamber defined by said tank above the surface level of said liquid, said liquid having a boiling point temperature within the normal operating temperature range of said transformer whereby vapors of said liquid are formed in said chamber during operation of said transformer, a closed bellows actuator disposed in said chamber, a compressed spring in said bellows actuator bearing against opposite ends thereof and tending to expand said bellows actuator, said vapors tending to collapse said bellows actuator, a pair of contacts disposed in a line lead of said transformer, and a spring toggle mechanism connecting said bellows actuator to one of said contacts whereby said contacts are automatically snapped closed when said bellows actuator is collapsed and automatically opened when said bellows actuator is expanded.

5. In a transformer immersed in a dielectric cooling liquid within a tank partially filled with said liquid, said tank defining a vaporization and condensation chamber above the surface level of said liquid, said liquid having a predetermined boiling point temperature within the normal operating temperature range of said transformer whereby vapors of said liquid are formed in said chamber during normal operation of said transformer, a device for prohibiting overheating of said transformer, said device operable to interrupt the circuit of said transformer upon overheating thereof and operable to automatically reclose said circuit upon cooling of said transformer subsequent to said overheating, said device comprising a pair of contacts disposed in said liquid in one line lead of said transformer and a closed hollow cylindrical bellows actuator disposed in said chamber, said bellows actuator having a compressed spring therein bearing against opposite ends thereof and continuously tending to expand said bellows actuator, said vapors continuously tending to compress said bellows actuator, one of said contacts being movable, said bellows actuator being fixed at one end thereof and movable at another end thereof, said another end connected by a spring toggle mechanism to said movable contact whereby said contacts are automatically snapped open and close respectively in response to a predetermined compression and expansion of said bellows actuator.

References Cited in the file of this patent

UNITED STATES PATENTS

| | | |
|---|---|---|
| 2,096,709 | Dunn | Oct. 26, 1937 |
| 2,341,241 | Reynolds | Feb. 8, 1944 |
| 2,459,522 | Grooms | Jan. 18, 1949 |
| 2,504,435 | Matteson | Apr. 18, 1950 |